March 4, 1930. L. C. GOAD 1,749,339
SHAFT CENTERING SUPPORT
Filed July 9, 1926
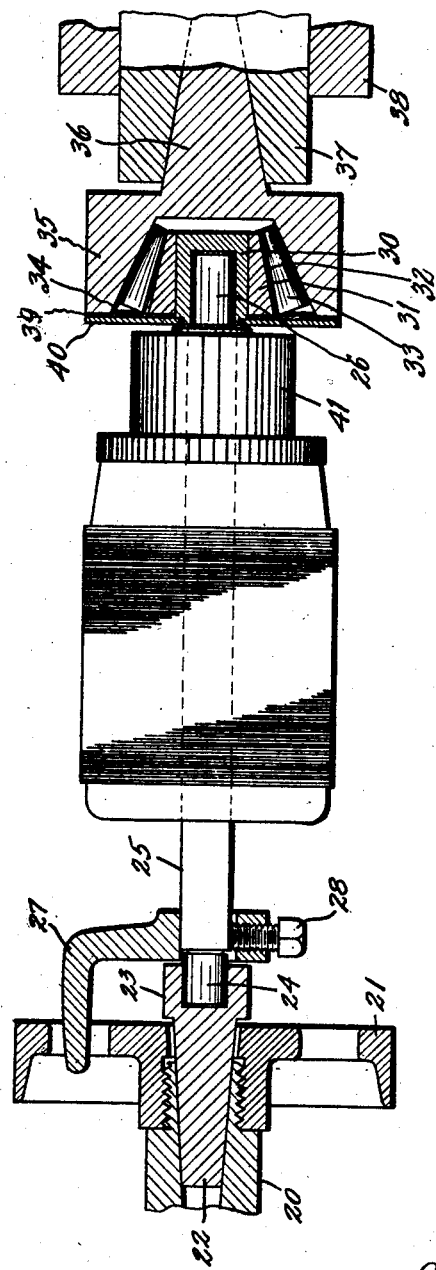
Inventor
Louis C. Goad
By Spencer Surall and Hardman
his Attorneys.

Patented Mar. 4, 1930

1,749,339

UNITED STATES PATENT OFFICE

LOUIS C. GOAD, OF ANDERSON, INDIANA, ASSIGNOR, BY MESNE ASSIGNMENTS, TO DELCO-REMY CORPORATION, OF DAYTON, OHIO, A CORPORATION OF DELAWARE

SHAFT-CENTERING SUPPORT

Application filed July 9, 1926. Serial No. 121,471.

This invention relates to metal cutting or abrading apparatus such as cutting lathes and grinding machines, and includes among its objects a provision of means for quickly centering a shaft so that it will rotate about the axis of its periphery.

Further objects and advantages of the present invention will be apparent from the following description, reference being had to the accompanying drawings, wherein a preferred form of embodiment of the present invention is clearly shown.

The figure of the drawing is a view partly in longitudinal section showing the application of the present invention to the centering of an armature shaft of a dynamo electric machine preparatory to truing the commutator so that its cylindrical surface will be exactly concentric to a journal of the shaft which is nearest to the commutator.

In the drawing, 20 designates the driving spindle of a lathe to which is attached a driving face plate 21, and a center 22 having a cylindrical recess in its cup-shaped end 23. The recess is coaxial with the spindle 20 and is adapted to receive snugly an end or journal 24 of a shaft 25. The face plate 21 drives the shaft 25 through a lathe dog 27 which is clamped to the shaft 25 by a set screw 28.

The shaft end or journal portion 26 is received by a suitable recess provided in a bushing 30 press-fitted into a bearing inner race member 31, the recess which receives the shaft portion 26 being exactly coaxial with the conical surface 32 of the race member 30. A plurality of equally dimensioned tapered bearing rollers 33 are located between the inner race 31 and a conical bearing surface 34 of a bearing outer race 35. The race 35 is supported by a conical tapered shank 36 which is received by a suitable tapered bore in a tail stock sleeve 37 which is slidably supported by a tail stock bracket 38. As is usual in lathes, the axis of the tapered bore in the sleeve 37 is coaxial with the axis of the spindle 20 and the center 22. The axis of the conical surface 34 is coaxial with the axis of the tapered shank 36, hence coaxial with the axis of the driving spindle 20 and center 22. The rollers 33 and the inner race 31 are retained by a felt sheet 39 and metal plate 40 attached to the outer race 35. These members cooperate to exclude particles of dust and grit from the anti-friction bearing.

As the tail stock sleeve 37 is moved toward the left of the drawing in the usual manner in order to take up end play between the shaft 25 and its supports, the bearing inner race 31 will be automatically located coaxial with the bearing outer race 35 and hence with the axis of the spindle 20 and driving center 22 if perchance any undue wear of either of the bearing race members has occurred which will ordinarily cause disalignment of said members. The shaft journal 26 fits snugly within the center recess of the bushing 30 in the bearing race 31. Therefore the journal 26 will be rotated about the axis of its cylindrical surface, and a cut made by a turning tool across the face of the commutator 41 which is supported by the shaft will provide the commutator with a cylindrical surface which is concentric to the cylindrical surface of the journal 26. Consequently, the periphery of the commutator 41 will be concentric with the bearing which supports the shaft journal 26. This is desirable because the shaft bearing adjacent the commutator is generally supported by the dynamo end frame which supports the brushes bearing upon the commutator. If the commutator periphery is not concentric with the bearing, the commutator will produce movement of the brushes relative to the axis of the armature shaft. When the commutator is rotating at relatively high speed, the brushes may be thrown out of contact with the commutator due to its eccentric movement although the eccentricity may be relatively small. The present invention therefore provides means for minimizing the eccentricity of the commutator periphery relative to the shaft bearing adjacent thereto. Brush contact pressure will be more uniform and the operation of the dynamo electric machine will be more efficient.

The present invention is particularly adapted for use with shafts which are ground by a centerless grinder which forms the journals 24 and 26 concentric with the main portion of the shaft 25. However it is apparent that the invention is adapted for supporting shafts which have been surfaced by other cutting and grinding tools.

By providing a lathe tail stock with a shaft centering device including an anti-friction bearing, the spindle-speed of the lathe may be increased over a lathe using the conventional conical tail stock center which enters a conical recess in the end of the shaft which is supported between its head and tail stocks.

While the form of embodiment of the present invention as herein disclosed, constitutes a preferred form, it is to be understood that other forms might be adopted, all coming within the scope of the claims which follow.

What is claimed is as follows:

1. A shaft centering support for a lathe stock, comprising in combination, a bearing outer-race member; a bearing inner-race member; anti-friction members between the race members, the bearing surfaces of said members being so shaped that axial movement of one race member relative to the other tends to align the axes of the race members; means for supporting one race member coaxially with the lathe stock; and means provided coaxially of the other race member for receiving a cylindrical body, a cylindrical surface of which is to be supported concentric to the axis of the lathe stock.

2. A shaft centering support for a lathe stock, comprising in combination, a bearing outer race member; a bearing inner race member concentric therewith; tapered anti-friction members between the race members, the bearing surfaces of said members cooperating to align the axes of the race members upon axial movement of one race member relative to the other; means for supporting one race member coaxially with the lathe stock; and means provided coaxially of the other race member for receiving a cylindrical body, a cylindrical surface of which is to be supported concentric to the axis of the lathe stock.

3. A shaft centering support for a lathe stock, comprising in combination, a bearing outer race member; a bearing inner race member concentric therewith; tapered anti-friction members between the race members, the bearing surfaces of said members cooperating to align the axis of the race members upon axial movement of one race member relative to the other; means for supporting one race member coaxially with the lathe stock; and means provided coaxially of the other race member for receiving a cylindrical body, a cylindrical surface of which is to be supported concentric to the axis of the lathe stock; and means for retaining the receiving means and said members in substantial axial alignment, and to exclude foreign matter from the cooperating members.

In testimony whereof I hereto affix my signature.

LOUIS C. GOAD.